United States Patent [19]

Obara et al.

[11] 4,309,519

[45] Jan. 5, 1982

[54] PROCESS FOR PRODUCING FLYBACK TRANSFORMER

[75] Inventors: Mitsuo Obara, Katsuta; Akira Kageyama; Isao Uchigasaki, both of Hitachi, all of Japan

[73] Assignee: Hitachi Chemical Company, Ltd., Tokyo, Japan

[21] Appl. No.: 167,047

[22] Filed: Jul. 9, 1980

[30] Foreign Application Priority Data

Sep. 10, 1979 [JP] Japan .................................. 54/116446

[51] Int. Cl.³ .......................................... C08F 283/00
[52] U.S. Cl. ...................................... 525/445; 525/43; 525/49; 526/280; 526/283; 528/298; 528/303; 528/306
[58] Field of Search ....................... 528/298, 303, 306; 526/280, 283; 525/445, 43, 49

[56] References Cited

U.S. PATENT DOCUMENTS

| | | | |
|---|---|---|---|
| 3,333,022 | 7/1967 | Reiners et al. | 528/298 |
| 3,995,099 | 11/1976 | Gaylord | 526/283 |
| 4,167,542 | 9/1979 | Nelson | 525/445 |
| 4,233,432 | 11/1980 | Curtis | 528/298 |

*Primary Examiner*—Lucille M. Phynes
*Attorney, Agent, or Firm*—Craig and Antonelli

[57] ABSTRACT

Flyback transformers having good adhesiveness, crack resistance, arc resistance, without producing corona discharge can be produced by insulation treating flyback transformers with a low-shrinkage resin composition comprising (a) an unsaturated polyester produced by reacting partially esterified dicyclopentadiene carboxylic acid, which has been obtained by reacting dicyclopentadiene or hydroxylated dicyclopentadiene, and maleic acid or anhydride, with one or more polyhydric alcohols, (b) a monomer having a vinyl group and (c) a low-shrinkage agent.

7 Claims, No Drawings

PROCESS FOR PRODUCING FLYBACK TRANSFORMER

BACKGROUND OF THE INVENTION

This invention relates to a process for producing a flyback transformer.

Flyback transformers can be divided into two types, one of which is a flat winding type wherein layer insulation is carried out by using a polyester film and the other of which is a divided winding type wherein insulation is carried out by a platic bobbin having a plurality of dividing walls. The flyback transformer is further equipped with various parts such as one or more diodes, resistors for controlling output properties, capacitors, and the like and insulation treated to give a finished product.

Since a high voltage is applied to individual constituting parts of the flyback transformer, there often bring about delamination between parts and an insulating material and cracks in casted material due to the delamination, and once cracks are produced, there brings about corona discharge, which causes dielectric breakdown of the flyback transformer.

As the casting materials for flyback transformers, there have been used silicone resins, epoxy resins, and the like. Silicone resins can be cured fast and are excellent in flexiblity and electrical properties but are poor in adhesiveness with the parts as well as hygroscopic properties (moisture resistance) and are very expensive, which limit applicable kinds of devices. On the other hand, epoxy resins have advantages in excellent adhesiveness and moisture resistance, but are poor in temperature-dependency of electrical properties and have a long curing time. Improvement of these defects has long been desired.

As to unsaturated polyester resins, conventional ones have advantages in a short curing time and a long pot life, but have large curing shrinkage which causes delamination from parts and cases and produces cracks which bring about corona discharge, these being fatal defects for practically producing flyback transformers from unsaturated polyester resins.

SUMMARY OF THE INVENTION

It is an object of this invention to provide a process for producing flyback transformers by insulation treating the flyback transformer with a low-shrinkage resin composition overcoming the defects mentioned above of conventional resins and having a long use time and a short curing time, and having good adhesiveness between the cured resin composition and the constituting parts of the flyback transformer as well as good crack resistance.

This invention provides a process for producing a flyback transformer which comprises insulation treating the flyback transformer with a low-shrinkage resin composition comprising:
(a) a polyester produced by an addition-condensation reaction of a partially esterified dicyclopentadiene carboxylic acid obtained by reacting at 150° C. or lower one of the following reactant groups (1) to (3):
  (1) dicyclopentadiene and maleic acid,
  (2) dicyclopentadiene, maleic anhydride and water, or
  (3) hydroxylated dicyclopentadiene and maleic anhydride, with one or more polyhydric alcohols,
(b) a monomer having one or more vinyl groups, and
(c) a low-shrinkage agent.

DESCRIPTION OF THE PREFERRED EMBODIMENTS

The flyback transformer produced by the process of this invention has excellent properties in dielectric strength and high reliability since there takes place no delamination and cracks due to good adhesiveness between the cured resin composition and the constituting parts of the flyback transformer. Further the low-shrinkage resin composition has a long pot life and is excellent in processability due to good impregnating properties of the resin composition.

The component (a), the polyester, is produced by addition-condensation reaction of a partially esterified dicyclopentadiene carboxylic acid with one or more polyhydric alcohols.

The partially esterified dicyclopentadiene carboxylic acid can be produced by reacting one of the following reactant groups (1) to (3):
  (1) dicyclopentadiene and maleic acid,
  (2) dicyclopentadiene, maleic anhydride and water, or
  (3) hydroxylated dicyclopentadiene and maleic anhydride.

in the above-mentioned reaction, an addition reaction of dicyclopentadiene with a carboxyl group of maleic acid takes place at a temperature of 150° C. or lower in the absence of a catalyst due to strong dissociation properties of a carboxyl group of maleic acid, and partially esterified dicyclopentadiene carboxylic acid can be obtained finally.

In the case of (1), dicyclopentadiene and maleic acid are mixed preferably in equimolar amounts and reacted at a temperature of 150° C. or lower, preferably 120° to 140° C. In the case of (2), dicylcopentadiene, maleic anhydride and water are mixed preferably in equimolar amounts and reacted at a temperature of 150° C. or lower, preferably 120° to 140° C. In the case of (3), hydroxylated dicyclopentadiene and maleic anhydride are mixed preferably in equimolar amounts and reacted at a temperature of 150° C. or lower, preferably 100° to 120° C. The resulting partially esterified dicyclopentadiene carboxylic acid can be handled as a monovalent carboxylic acid as a starting material for producing polyesters.

As the polyhydric alcohols, there can be used ethylene glycol, propylene glycol, diethylene glycol, dipropylene glycol, 1,3-butylene glycol, neopentyl glycol, 1,6-hexanediol, and the like. The polyhydric alcohols can be used singly or as a mixture thereof.

Mixing ratio of the partially esterified dicyclopentadiene and the polyhydric alcohol is preferably 2 moles of the former per mole of the latter and an alcohol excess rate of 0 to 30%. A preferable reaction temperature range is from 150° to 210° C. to give the desired polyester.

Since the thus produced polyester dissolved in a monomer having a vinyl group has a large shrinkage and is poor in adhesiveness to the cases and parts as well as crack resistance, as in the case of conventional unsaturated polyesters, it is necessary to mix a low-shrinkage agent so as to give a low-shrinkage resin composition.

As the component (b), monomers having one or more vinyl groups, there can be used styrene, α-methylstyrene, o-methylstyrene, m-methylstyrene, p-methylstyrene, dimethylstyrene, ethylstyrene, p-t-butylstyrene, chlorostyrene, and the like.

These monomers can be used singly or as a mixture thereof.

The low-shrinkage agent, the component (c), means an agent which makes the resulting resin composition having low-shrinkage and includes, for example, a polystyrene, a poly(vinyl acetate), a saturated polyester, and the like. The low-shrinkage agent preferably has good compatibility with the polyester component (a) and a low viscosity and gives adhesivenss to the resin composition. When polystyrenes are used, those having a molecular weight of 50,000 to 300,000 are preferable, e.g. QP-2 manufactured by Denki Kagaku Kogyo Kabushiki Kaisha, Japan, HT-44 manufactured by Mitsubishi Chemical Industries, Ltd., STYRON 679 manufactured by Asahi-Dow Ltd. etc. When poly(vinyl acetate) is used, that having a molecular weight of 10,000 to 90,000 is preferable, e.g. GOHSENYL NZ-5 manufactured by the Nippon Synthetic Chemical Industry Co., Ltd., Japan, etc. When saturated polyesters are used, those having a molecular weight of 5,000 to 50,000 are preferable, e. g. BYRON 300 manufactured by Toyobo Co., Ltd., Japan, etc.

The low-shrinkage resin composition preferably comprises the component (a), the polyester, in an amount of 50 to 40 parts by weight, the component (b), the monomer, in an amount of 44 to 54 parts by weight, and the component (c), the low-shrinkage agent, in an amount of 4 to 10 parts by weight.

The low-shrinkage resin composition may contain one or more curing catalysts, curing accelerators and polymerization inhibitors, if required, in order to control curing properties and pot life.

As the curing catalysts, there can be used those which are usually used for curing unsaturated polyesters, for example, methyl ethyl ketone peroxide, benzoyl peroxide, cyclohexanone peroxide, t-butyl perbenzoate, t-butyl peroxy octoate, 1,1-bis(t-butylperoxy)-3,3,5-trimethyl cyclohexane, etc.

As the curing accelerators, there can be used materials which can make easy for generating active radicals, for example, cobalt naphthenate, cobalt octoate, manganese naphthenate, cobalt acetyl acetate, dimethylaniline, etc.

As the polymerization, inhibitors there can be used hydroquinone, para-benzoquinone, catechol, diphenylquinone, methyl hydroquinone, etc.

Further, the low-shrinkage resin composition may contain the following additives in order to improve various properties.

In order to improve arc resistance and tracking resistance, there can be added one or more fillers such as talc, mica, glass powder, silica, hydrated alumina, calcium carbonate, magnesium hydroxide, etc.

In order to improve fire retardant properties, there can be added one or more fire retardants conventionally used such as halides, phosphor compounds, antimony compounds, etc.

In order to improve moisture resistance of the resin composition when a filler is added thereto, there can be used one or more coupling agents such as silane coupling agent, etc.

Insulation treatment of the flyback transformer can be conducted by, for example, setting coils under vacuum of 10 to 20 mmHg, vacuum pouring the low-shrinkage resin composition previously defoamed under vacuum (at 10 to 20 mmHg for 5 minutes) at a liquid temperature of 20° to 30° C. for about 60 seconds, and curing the resin at 25° C. for 4 hours, at 80° C. for 2 hours and at 105° C. for 7 hours.

This invention is illustrated by way of the following Examples, in which all parts and percents are by weight unless otherwise specified.

EXAMPLE 1

Unsaturated polyesters (A) to (E) were prepared as follows.

(A)

264 Parts of dicylcopentadiene, 196 parts of maleic anhydride, and 36 parts of water were reacted under a nitrogen stream at 140° C. for 2 hours to give partially esterified dicyclopentadiene carboxylic acid. To the partially esterified dicyclopentadiene carboxylic acid, there were added 83.6 parts of propylene glycol and a dehydration-condensation reaction was carried out at 210° C. according to a conventional method. The resulting resin in an amount of 100 parts was dissolved in 100 parts of styrene containing 0.02% of hydroquinone to give unsaturated polyester (A).

(B)

300 Parts of hydroxylated dicyclopentadiene and 196 parts of maleic anhydride were reacted under a nitrogen stream at 120° C. for 2 hours to give partially esterified dicyclopentadiene carboxylic acid. To this, 83.6 parts of propylene glycol were added and a dehydration-condensation reaction was carried out at 210° C. according to a conventional method. The resulting resin in an amount of 100 parts was dissolved in 100 parts of styrene containing 0.02% of hydroquinone to give unsaturated polyester (B).

(C)

Partially esterified dicyclopentadiene carboxylic acid was synthesized in the same manner as described in (A). To this, 127 parts of diethylene gylcol were added and a dehydration-condensation reaction was carried out at 210° C. according to a conventional method. The resulting resin in an amount of 100 parts was dissolved in 100 parts of styrene containing 0.02% of hydroquinone to give unsaturated polyester (C).

(D)

Partially esterified dicyclopentadiene carboxylic acid was synthesized in the same manner as described in (A). To this, 130 parts of 1,6-hexanediol was added and a dehydration-condensation reaction was carried out at 150°–210° C. according to a conventional method. The resulting resin in an amount of 100 parts was dissolved in 100 parts of styrene containing 0.02% of hydroquinone to give unsaturated polyester (D).

(E)

Partially esterified dicyclopentadiene carboxylic acid was synthesized in the same manner as described in (B). To this, 31 parts of ethylene glycol and 93.8 parts of dipropylene glycol were added and a dehydration-condensation reaction was carried out at 150°–210° C. according to a conventional method. The resulting resin in an amount of 100 parts was dissolved in 100 parts of styrene containing 0.02% of hydroquinone to give unsaturated polyester (E).

To 80 parts of each unsaturated polyester thus produced, 20 parts of a styrene solution containing 30% of polystyrene (QP-2 manufactured by Denki Kagaku Kogyo Kabushiki Kaisha, molecular weight 150,000-200,000) was added to give a uniformly dissolved low-shrinkage resin composition. To this, a curing catalyst and curing accelerator as listed in Table 1 were added and further a fire retardant, a filler and a coupling agent as listed in Table 1 were mixed to give a casting resin. Using these casting resins, insulation treatment of flyback transformers was carried out under the conditions as listed in Table 1.

From the upper portion of the coils of a flyback transformer, the casting resin thus prepared with a liquid temperature of 20° to 30° C. was poured under a degree of vacuum 10-20 mmHg and cured at 25° C. for 4 hours, at 80° C. for 2 hours and at 105° C. for 7 hours to give a flyback transformer casted with the low-shrinkage resin composition. Impregnating properties, voids in the coils, cracks, arc resistance, tracking resistance, and fire retardant properties were tested and the results were listed in Table 2.

EXAMPLE 2

To 80 parts of unsaturated polyester (A) or (B) prepared in Example 1, 20 parts of styrene solution containing 30% of poly(vinyl acetate) (GOHSENYL NZ-5 manufactured by the Nippon Synthetic Chemical Industry Co., Ltd. molecular weight 43,000) was added to give a uniformly dissolved low-shrinkage resin composition. Casting resins as listed in Table 1 were prepared in the same manner as described in Example 1. Using the casting resins, flyback transformers were insulation treated as described in Example 1. The finished products had good properties as shown in Table 2.

EXAMPLE 3

To 80 parts of unsaturated polyester (A) or (B) prepared in Example 1, 20 parts of a styrene solution containing 30% of saturated polyester (BYRON 300 manufactured by Toyobo Co., Ltd. molecular weight 20,000) was added to give a uniformly dissolved low-shrinkage resin composition. Casting resins as listed in Table 1 were prepared in the same manner as described in Example 1. Using the casting resins, flyback transformers were insulation treated as described in Example 1. The finished products had good properties as shown in Table 2.

COMPARATIVE EXAMPLE 1

To 100 parts of unsaturated polyester (A) prepared in Example 1, a curing accelerator, a curing catalyst, a fire retardant, a filler, and a coupling agent as listed in Table 1 were added and mixed to give a casting resin. Using the casting resin, a flyback transformer was insulation treated as described in Example 1. Cracks were generated in the coils, which produced corona discharge as shown in Table 2. Further, corona was produced even at the operation at low temperatures.

TABLE 1

| Formulation (parts) | Example No. Run No. | Example 1 1 | 2 | 3 | 4 | 5 | Example 2 6 | 7 | Example 3 8 | 9 | Comparative Example 10 |
|---|---|---|---|---|---|---|---|---|---|---|---|
| Unsaturated polyester (A) | | 80 | — | — | — | — | 80 | — | 80 | — | 100 |
| Unsaturated polyester (B) | | — | 80 | — | — | — | — | 80 | — | 80 | — |
| Unsaturated polyester (C) | | — | — | 80 | — | — | — | — | — | — | — |
| Unsaturated polyester (D) | | — | — | — | 80 | — | — | — | — | — | — |
| Unsaturated polyester (E) | | — | — | — | — | 80 | — | — | — | — | — |
| Polystyrene (a styrene monomer solution of 30%) | | 20 | 20 | 20 | 20 | 20 | — | — | — | — | — |
| Poly(vinyl acetate) (a styrene monomer solution of 30%) | | — | — | — | — | — | 20 | 20 | — | — | — |
| Saturated polyester (a styrene monomer solution of 30%) | | — | — | — | — | — | — | — | 20 | 20 | — |
| 6% Cobalt octoate | | 0.5 | 0.5 | 0.5 | 0.5 | 0.5 | 0.5 | 0.5 | 0.5 | 0.5 | 0.5 |
| Methyl ethyl ketone peroxide | | 1.0 | 1.0 | 1.0 | 1.0 | 1.0 | 1.0 | 1.0 | 1.0 | 1.0 | 1.0 |
| Red phosphorus | | — | — | — | 10 | — | — | — | — | — | — |
| Surface treated red phosphorus (RP-120 manuf. by Rin Kagaku Kogyo Co., Ltd.) | | 10 | 10 | 10 | — | — | 10 | — | 10 | — | 10 |
| Hexabromobenzene (HBB-20 manuf. by Hitachi Chemical Co., Ltd.) | | — | — | — | — | 16 | — | 16 | — | 16 | — |
| Antimony trioxide (manuf. by Nippon Seiko K.K.) | | — | — | — | — | 8 | — | 8 | — | 8 | — |
| Hydrated alumina (H-32 manuf. by Showa Denko K.K.) | | 150 | 100 | 130 | 150 | 100 | 150 | 100 | 150 | 100 | 150 |
| Silica (Crystal Sheet AA manuf. by Tatsumori K.K.) | | — | 50 | — | — | 50 | — | 50 | — | 50 | — |
| Talc (Imported by Kunimine Koka Kogyo K.K.) | | — | — | 20 | — | — | — | — | — | — | — |
| Coupling Agent (KBM-503 manuf. by Shin-etsu Chemical Industry Co., Ltd.) | | — | 1.0 | — | — | — | — | 1.0 | — | 1.0 | — |
| Producing conditions of flyback transformer | Pouring conditions | 20°-30° C., 10-20 mmHg | | | | | Temp. 20°-30° C., Degree of vacuum 10-20 mmHg | | | | |
| | Curing conditions | 25° C./4 hrs + 80° C./2 hrs + 105° C./7 hrs | | | | | 25° C./4 hrs + 80° C./2 hrs + 105° C./7 hrs | | | | |

TABLE 2

| Properties | Example No. Run No. | Example 1 1 | 2 | 3 | 4 | 5 | Example 2 6 | 7 | Example 3 8 | 9 | Comparative Example 1 10 |
|---|---|---|---|---|---|---|---|---|---|---|---|
| Compatibility and dispersibility | | Good | Good | Good | Good | Good | Good | Good | Good | Good | Good |

TABLE 2-continued

| Properties | Example No. Run No. | Example 1 | | | | | Example 2 | | Example 3 | | Comparative Example 1 |
|---|---|---|---|---|---|---|---|---|---|---|---|
| | | 1 | 2 | 3 | 4 | 5 | 6 | 7 | 8 | 9 | 10 |
| of unsaturated polyester, low-shrinkage agent, filler and fire retardant | | | | | | | | | | | |
| Fire retardant properties OL 94 (1/16 inch thick) | | 94V-0 | 94V-0 | 94V-0 | 94V-0 | 94V-0 | 94V-0 | 94V-0 | 94V-0 | 94V-0 | 94V-0 |
| Arc resistance (sec) | | 134 | 120 | 120 | 140 | 120 | 130 | 120 | 134 | 120 | 134 |
| Presence of voids in coils* | | o | o | o | o | o | o | o | o | o | o |
| Presence of cracks in coils | | o | o | o | o | o | o | o | o | o | x |
| Impregnating properties** | | o | o | o | o | o | o | o | o | o | o |
| Production of corona*** | After cured | o | o | o | o | o | o | o | o | o | x |
| | After allowed to stand at low temp. (−15° C.) | o | o | o | o | o | o | o | o | o | x |

Note
*The coil was cut and observed by a microscope, o None; x Yes.
**The coil was cut and observed by a microscope, o Good; x No good.
***The flyback transformer was operated and production of corona was observed. o None; x Yes.

As mentioned above, flyback transformers insulation treated with the low-shrinkage resin composition mentioned above and having the following advantages can be produced effectively.

The advantages are:

Since the resin can be impregnated into the coils of flyback transformers sufficiently, there hardly takes place corona discharge and reliability is improved.

Since pot life of the resin composition is long and curing time is short, processability in the step of insulation treatment of flyback transformers are good and the treating steps can be shortened.

There is no corrosion in the magnet wire electrodes.

When flyback transformers are left to stand under high temperatures and high humidity, changes in high-voltage regulation properties become smaller.

Forcus resistors and ferrite core, which are constituting parts of a flyback transformer, can be insulated as one piece.

What is claimed is:

1. A process for producing a flyback transformer which comprises insulatin treating the flyback transformer with a low-shrinkage resin composition comprising:
   (a) a polyester produced by an addition-condensation reaction of a partially esterified dicyclopentadiene carboxylic acid obtained by reacting one of the following reactant groups (1) to (3) at 150° C. or lower:
      (1) dicyclopentadiene and maleic acid,
      (2) dicyclopentadiene, maleic acid and water, or
      (3) hydroxylated dicyclopentadiene and maleic anhydride,
   with one or more polyhydric alcohols,
   (b) a monomer having one or more vinyl groups, and
   (c) a low-shrinkage agent.

2. A process according to claim 1, wherein the monomer b) is styrene, α-methylstyrene, o-methylstyrene, m-methylstryene, p-methylstyrene, dimethylstyrene, ethylstyrene, p-t-butylstyrene, chlorostyrene or a mixture thereof.

3. A process according to claim 1, wherein the polyhydric alcohol is ethylene glycol, propylene glycol, diethylene glycol, dipropylene glycol, 1,3-butylene glycol, neopentyl glycol, 1,6-hexanediol, or a mixture thereof.

4. A process according to claim 1, wherein the low-shrinkage agent (c) is a polystyrene, a poly(vinyl acetate) or a saturated polyester.

5. A process according to claim 1, wherein the low-shrinkage resin composition comprises 50 to 40 parts by weight of the polyester (a), 44 to 54 parts by weight of the monomer (b) and 4 to 10 parts by weight of the low-shrinkage agent (c).

6. A process according to claim 1 or 5, wherein the low-shrinkage resin composition further contains one or more members selected from curing catalysts, curing accelerators, polymerization inhibitors, fillers, and fire retardants.

7. A flyback transformer insulation treated with a low-shrinkage resin composition comprising:
   (a) a polyester produced by an addition-condensation reaction of a partially esterified dicyclopentadiene carboxylic acid obtained by reacting one of the following reactant groups (1) to (3) at 150° C. or lower;
      (1) dicyclopentadiene and maleic acid,
      (2) dicyclopentadiene, maleic acid and water, or
      (3) hydroxylated dicyclopentadiene and maleic anhydride,
   with one or more polyhydric alcohols,
   (b) a monomer having one or more vinyl groups, and
   (c) a low-shrinkage agent.

* * * * *